Jan. 17, 1928. 1,656,404
P. VAN CLEEF
KNIFE
Filed March 16, 1927
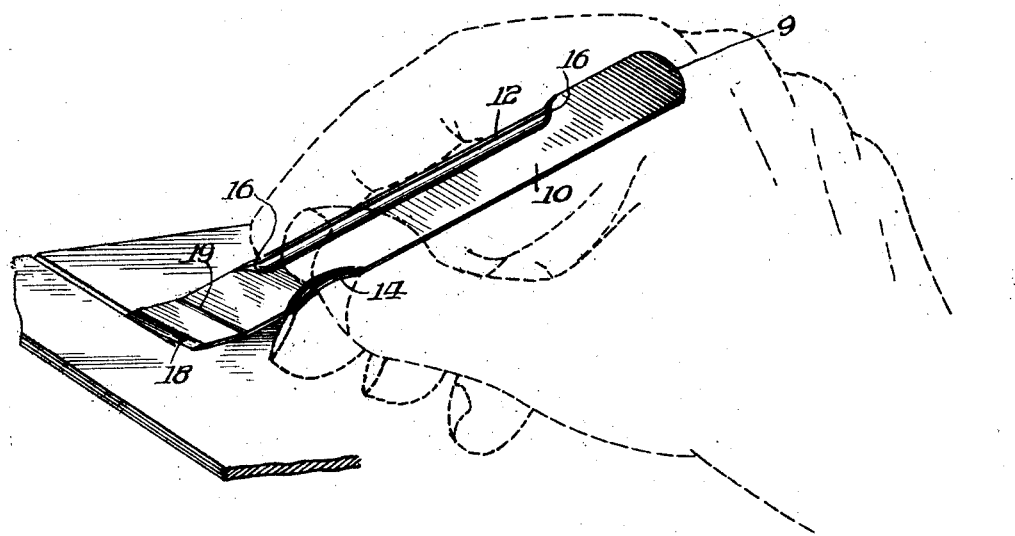
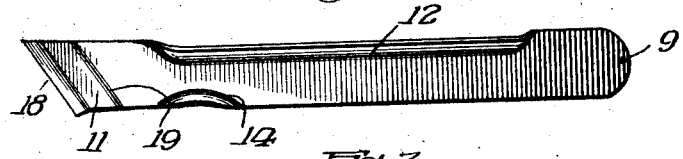
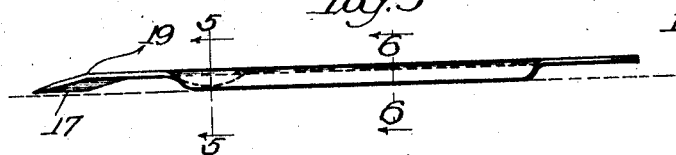
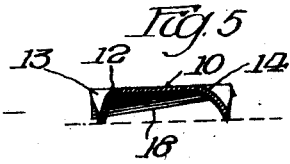
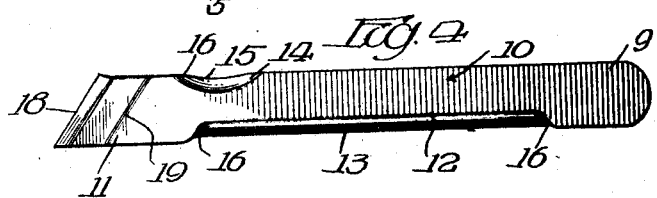
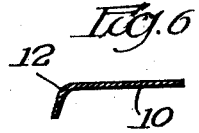

Patented Jan. 17, 1928.

1,656,404

UNITED STATES PATENT OFFICE.

PAUL VAN CLEEF, OF CHICAGO, ILLINOIS, ASSIGNOR TO VAN CLEEF BROTHERS, A PARTNERSHIP CONSISTING OF NOAH VAN CLEEF, FELIX VAN CLEEF, MAXIME VAN CLEEF, AND PAUL VAN CLEEF, OF CHICAGO, ILLINOIS.

KNIFE.

Application filed March 16, 1927. Serial No. 175,671.

The invention relates to knives and more particularly to those knives which are formed from a flat strip of sheet metal and are adapted to be held between the thumb and first and second fingers, similarly to a pencil or pen.

One object of the invention is to provide a knife of this type in which the side edges of the handle are deflected upwardly to form recesses or pockets for receiving the first and second fingers of the user so that the knife may be conveniently and securely gripped.

Another object of the invention is to provide a sheet metal knife which is of new and improved construction and may be produced at a comparatively low cost.

Other objects of the invention will appear hereinafter from the detailed description.
The invention consists in the several novel features hereinafter set forth and more particularly defined by claims at the conclusion hereof.

In the drawing: Fig. 1 is a perspective of a knife embodying the invention. Fig. 2 is a top view. Fig. 3 is a side elevation. Fig. 4 is a bottom view. Fig. 5 is a section taken on line 5—5 of Fig. 3. Fig. 6 is a section taken on line 6—6 of Fig. 3.
The invention is exemplified in a knife which is formed from a flat strip 9 of sheet metal and consists of a handle 10 and a blade 11. The knife is adapted to be held in one hand of the user, between the thumb and first and second fingers, as shown by dotted lines in Fig. 1, and has special utility for use in cutting sheet material. One of the side edges of the handle is deflected upwardly, as at 12. The deflected portion extends from the blade to a point adjacent the rear end of the handle and forms a relatively long pocket 13 which is of sufficient length to receive the first finger throughout its entire length. This portion is adapted to be gripped between the first finger and the tip of the thumb. The other side of the handle is deflected upwardly, as at 14. This deflected portion is disposed adjacent the blade 11 and forms a pocket 15 which is relatively short and is adapted to receive a portion of the part of the second finger which extends transversely across the bottom face of the handle. The deflected portions serve additionally to reinforce the handle, and their ends form abutments 16 for the first and second fingers so that the knife will not slip lengthwise when used.

The front end of the blade is cut at an acute angle with respect to the sides so that it assumes the proper position when the knife is held in its operative position and is bevelled, as at 17, to form a cutting edge 18. The blade is bent upwardly on a line 19 which extends parallel to the cutting edge 18, a sufficient distance so that the latter is disposed inwardly of the outer edges of the deflected portions. Thus, when the knife rests upon the bottom face of the handle or the edges of the deflected portions, the cutting edge is spaced from the supporting surface, as shown in Fig. 3 and injury or damage to it is avoided.

In use, the handle of the knife will be gripped between the thumb and the first and second fingers, similarly to a pencil or pen. In this position the first finger will fit in pocket 13, the second finger will extend across the bottom face of the handle and will fit in pocket 15, and the thumb will rest upon the top face of the handle and will abut against the deflected portion which forms pocket 13. The knife is thus securely and conveniently gripped and will not slip from the hand during use.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A knife formed from a flat strip of sheet metal and adapted to be held between the thumb and first and second finger of the user, said knife comprising a handle and a blade, one of the side edges of the handle being deflected to form a relatively long pocket for receiving the first finger, and the other of the side edges being deflected to form a relatively small pocket for receiving a portion of the second finger.

2. A knife formed from a flat strip of sheet metal and comprising a handle and a blade, the side edges of the handle being deflected, the blade being bent transversely to the handle in the direction of the deflected edges and to position the cutting edge between said edges and the outer face of the handle.

Signed at Chicago, Illinois, this 12th day of March, 1927.

PAUL VAN CLEEF.